A. W. WILCOX.

Organ Reed-Board.

No. 6,637. Reissued Sept. 7, 1875.

*Witnesses:*

A. McDallum

D. G. Stuart

*Inventor:*

Alfred W. Wilcox by his atty

P. Hanway

N. PETERS, PHOTO-LITHOGRAPHER, WASHINGTON, D. C.

UNITED STATES PATENT OFFICE.

ALFRED W. WILCOX, OF WORCESTER, MASSACHUSETTS.

IMPROVEMENT IN ORGAN REED-BOARDS.

Specification forming part of Letters Patent No. 140,750, dated July 8, 1873; reissue No. 6,637, dated September 7, 1875; application filed August 7, 1875.

DIVISION A.

*To all whom it may concern:*

Be it known that I, ALFRED W. WILCOX, formerly of New Haven, Connecticut, now of Worcester, in the county of Worcester and State of Massachusetts, have invented certain new and useful Improvements in Organ Reed-Boards; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
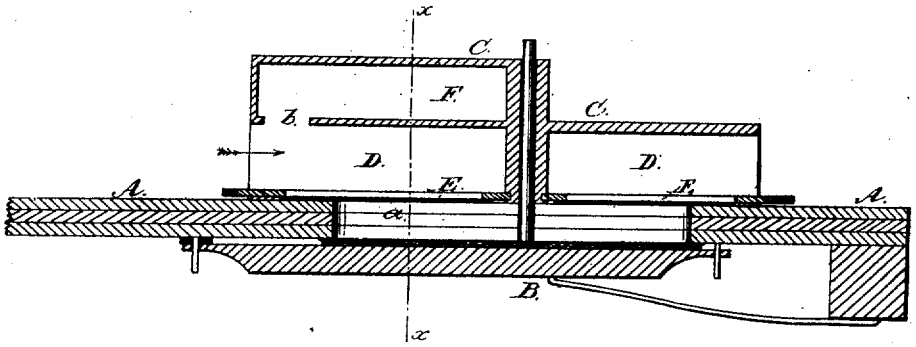
Figure 2:
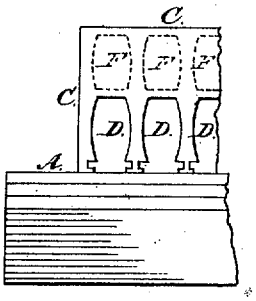
Figure 3:
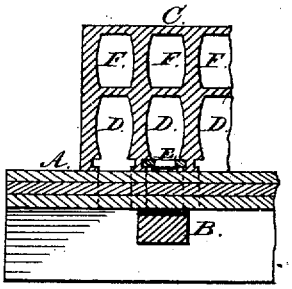

Figure 1 represents a vertical transverse section through the reed and sound or valve board, taken centrally through a pair of reeds and cells. Fig. 2 represents a front view of a portion of the same; and Fig. 3, a vertical section of the latter, taken through the line *x x* of Fig. 1.

This division of my invention relates to a new and improved construction of the reed cells or chambers of organs, melodeons, and other similar reed-instruments, with the view of perfecting and equalizing their tone.

The invention consists in combining, with the reed-chamber proper, an auxiliary air-chamber, so arranged and constructed as to communicate with the former at or near its open end, it being otherwise completely closed, except at that opening.

To enable those skilled in the art to make, construct, and use my improvement, I will now proceed to describe its parts in detail, omitting a description of such parts of the instrument as may not be essential to a full understanding of the invention.

The sound-board A may be made in any of the known ways, but I prefer to make it of thin strips or sheets of veneers, laid and glued together crosswise of the grain to each other, so as to free it from all tendency to warp; but as this feature forms the separate subject-matter of Division B of this reissue, it is not deemed necessary to further describe it in this. The sound-board is provided with the usual slits or valve-openings *a*, beneath which are arranged the valves B, and which may be operated in the ordinary or other suitable and known way. C represents the reed-board proper; D, the reed cells or chambers; and E the reeds, the latter two being constructed and arranged substantially as in common use. Above the reed-cells D, however, the reed-board is provided with a series of auxiliary air-chambers, F, corresponding in number with chambers D, each of which is provided with an opening, *b*, which communicates with one of the latter, at or near its mouth. Preferably, each of these auxiliary chambers F is formed of about the same size or capacity as its chamber D, with which it communicates.

The auxiliary chamber F may not only be applied to the chamber D of the lower reeds, but may also be, with nearly equal advantage, applied to all.

The operation is as follows: The valve B being opened, air rushes into chamber D and past opening *b*, and thence down through the reed E. In passing opening *b* the inflowing air draws air from chamber F until the quantity of air therein is reduced equal to the draft therefrom from the inflowing air. The vibrations of the reed naturally create a tremor or somewhat interrupted flow to the air, causing the remaining air in the auxiliary chamber—and which, to a certain extent, now forms a partial vacuum—to vibrate in unison or harmony with the vibrations of the reed, thereby imparting a better, smoother, and stronger tone to the latter than in cells of the usual construction.

Having described my invention, what I claim as new, and desire to secure by Letters Patent, is—

1. An auxiliary air-chamber, F, provided with an opening, *b*, in combination with a reed cell or chamber, D, of a musical instrument, substantially as and for the purpose set forth.

2. A reed or tube board, C, provided with cells D and auxiliary communicating chambers F, substantially as set forth.

In testimony that I claim the foregoing, I have hereunto set my hand this 7th day of July, 1875.

ALFRED W. WILCOX.

Witnesses:
DAVID MANNING, Jr.,
ALFRED D. WARREN.